Sept. 8, 1964
G. H. ROHRBACK
3,148,348
THIN FILM DETECTORS
Filed Sept. 13, 1960
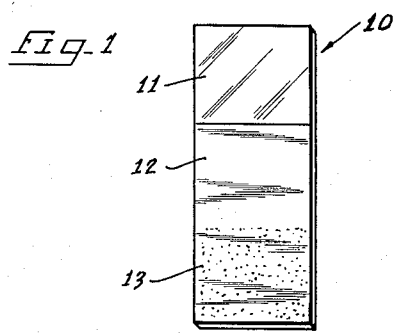
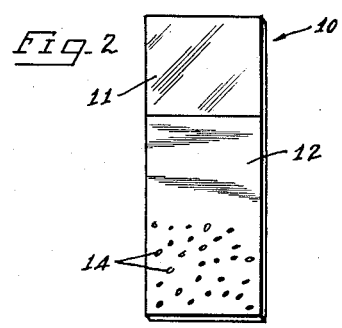
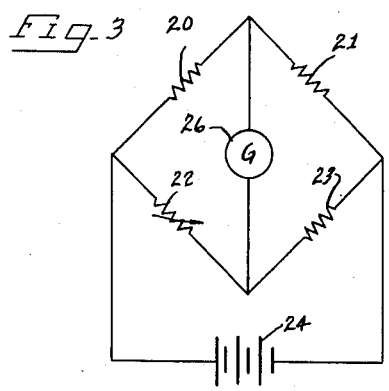
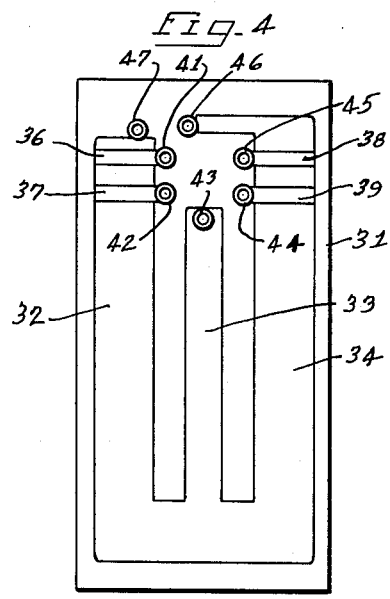
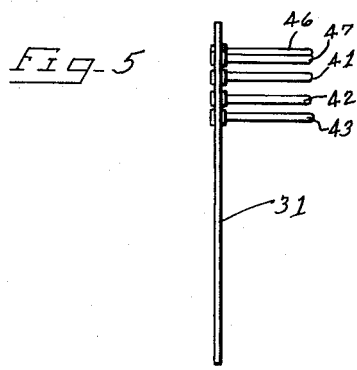
INVENTOR.
Gilson H. Rohrback
ATTORNEYS

United States Patent Office 3,148,348
Patented Sept. 8, 1964

3,148,348
THIN FILM DETECTORS
Gilson H. Rohrback, Whittier, Calif., assignor to Magna Products, Incorporated, Santa Fe Springs, Calif., a corporation of California
Filed Sept. 13, 1960, Ser. No. 55,648
10 Claims. (Cl. 338—13)

The present invention is directed to improvements in the field of testing corrosive environments and provides an improved corrosion detector of wide applicability.

Corrosion test specimens heretofore developed have taken a wide variety of forms from the simple steel coupons which are positioned within the corrosive environment and the progress of corrosion measured by visual inspection and weight loss, to the more recently developed, highly sensitive test probes which are capable of giving a continuous indication of corrosion even at very low levels of corrosion.

The present invention provides an improved corrosion test specimen which is adapted for use in a wide variety of environments in which previously developed test specimens and test probes are, for one reason or another, not particularly suited. One such field of application resides in testing for moisture vapor in sealed packages containing a desiccant.

An object of the present invention is to provide an improved corrosion test specimen which is extremely sensitive to corrosion.

A further object of the invention is to provide an improved corrosion test specimen employing an extremely thin metallic film as the corroding element.

Another object of the invention is to provide an improved corrosion test specimen in which the progress of corrosion can be detected both visually and continuously by means of electrical resistance measurements.

Still another object of the invention is to provide an improved corrosion test assembly embodying the improved corrosion test specimen of the invention.

The corrodible element in the new corrosion test specimen consists of an extremely thin metallic film which may be sensitized to provide a rapidly corrodible test specimen. The metal to be employed, of course, varies with the application to which the corrosion test specimen is to be put. Extremely thin films of iron are very suited for use in testing for moisture vapor. Thin films of a highly electropositive metal such as zinc are useful in testing for the presence of water in hydrocarbons such as jet fuels. Iron films can also be used for detecting contaminants in the atmosphere or for detecting acidic substances in motor oil.

In accordance with the present invention, the extremely thin metallic film is supported on a backing which is electrically non-conductive, non-corrodible, and is preferably optically transparent. While glass and ceramic materials may be suitably employed, these materials are quite brittle and for that reason I prefer to employ, as a backing material, a synthetic resin of sufficient thickness to be self-sustaining. By "self-sustaining" I mean that the sheet of resin is sufficiently thick so that it is not limp but it is still sufficiently thin so that it is readily flexible. Generally speaking, a backing thickness of about 0.040 to 0.10 inch will be satisfactory.

The synthetic resin employed for a backing must have a low moisture transmission property and should be inert with respect to the metal of the film. For this reason, it is advisable not to employ certain filled resins which contain materials which are corrosive to the metal. Specifically, I prefer to employ vinyl resins as the backing material, more particularly, polyvinyl chloride resins. Other thermoplastic or thermosetting resins, however, can be employed including, by way of example, materials such as polystyrene, polyacrylates, polymethacrylates, alkyd resins, polyester resins, silicones, epoxys, melamine-formaldehyde resins, phenolic resins, and the like. Because the resinous surface receives a metal coating, it is not advisable to use the waxy type resins such as polyethylene and polytetrafluoroethylene resins which are not particularly receptive to metal deposits.

Preparatory to applying the metallic film to the backing surface, it is advisable to clean and degrease the surface by rubbing it with a suitable solvent such as methanol.

One of the marked advantages possessed by the corrosion test specimen of the present invention arises because of the extremely thin nature of the metallic deposit. The sensitivity is improved because, under given operating conditions, a greater percentage of the cross-sectional area is eroded in an extremely thin specimen than in a thicker one. Since the metallic films of the present invention have thicknesses on the order of 1 to 20 micro-inches, their response to corrosive attack is very high and the corrosivity of a given environment can be checked within a very short time.

The extremely thin films of metal can be deposited in a variety of manners, but I prefer to employ the technique of vacuum deposition. In this type of process, the plastic sheet is coated with metal which has been volatilized from a heated supply of the metal under conditions of vacuum normally on the order of .01 to 100 microns of mercury absolute pressure. A typical apparatus may consist of an evacuated vessel in which a suitable support for the backing film is located. The support may be provided with suitable masking means for confining the metal deposition only to those areas where it is desired. The vaporizing source may consist of an electrically heated tungsten wire having a helical iron wire wrapped around it when the tungsten wire is heated to white heat, the iron vaporizes and deposits out on the surfaces of the backing which are exposed to the vaporizing source.

One of the important features of the present invention resides in the sensitization of the thin metallic film to render it even more susceptible to corrosion. Since corrosion is generally considered to be the result of reaction between anodic and cathodic sites on a metal surface, the sensitizing materials of the present invention facilitate these reactions by providing for an increased electrical conductivity between the sites by providing an ionized electrolyte between the sites. The sensitizing agents may also act to destroy the protective effect provided by an oxide layer formed on the corrosion test specimen.

In the manufacture of the test specimen of the present invention, sensitization is achieved by applying a thin, porous layer of an inorganic salt over at least a portion of the previously deposited metallic film. In order for the salt to function effectively, it must be non-hydroscopic, and must be non-deliquescent. Ammonium chloride appears to be the best sensitizer, but other salts possessing these properties may also be employed.

The following table lists suitable anions and cations of salts which can satisfactorily be employed:

| Anions | Cations |
|---|---|
| Acetate | Ammonium |
| Bromate | Calcium |
| Bromide | Ferrous |
| Chlorate | Lithium |
| Chloride | Magnesium |
| Fluoride | Potassium |
| Nitrate | Sodium |
| Perchlorate | |
| Sulfate | |

One significant feature of the sensitizers employed resides in their ability to accelerate corrosion without changing the conditions under which corrosion occurs. For example, ferrous metals do not corrode appreciably in air at a relative humidity below about 35%. When the ferrous metal is sensitized with the salt application, the same holds true, but at higher relative humidities, the corrosion rate is materially accelerated.

A further description of the present invention will be made in conjunction with the attached sheet of drawings in which:

FIGURE 1 is a view in elevation of an improved corrosion test specimen according to the present invention;

FIGURE 2 is a view in elevation of the specimen after corrosion has taken place;

FIGURE 3 is an electrical circuit diagram indicating the manner of incorporating a test specimen into a resistance measuring circuit;

FIGURE 4 is a plan view of a corrosion probe according to this invention particularly suited for use in bridge circuits of the type shown in FIGURE 3; and FIGURE 5 is a side elevational view of the probe of FIGURE 4.

As shown in the drawings:

In FIGURE 1, reference numeral 10 indicates generally a corrosion test specimen produced according to the present invention. In the particular form illustrated in FIGURE 1, the test specimen has three surface areas, a clear area 11 consisting of the exposed backing material, a metal film area 12 containing the extremely thin film of the corrodible metal, and a sensitized metal film area 13 in which area the metal film has been treated with the sensitizing salt. The most convenient means for applying this salt to the metal film consists in dissolving the salt in a suitable solvent such as methanol then spraying it on although other procedures such as dipping can also be used. A quantity of salt as low as 0.01 milligram per square inch of surface has been found to be satisfactory, but larger amounts can be used. The purpose of sensitizing only a portion of the applied metallic film is to facilitate a visual inspection of the specimen. Since the sensitized portion 13 corrodes at a much faster rate than the unsensitized portion 12, the areas of corrosion are rendered contrastingly visible by comparison to the slightly corroded, or uncorroded metallic film. This is best illustrated in FIGURE 2 of the drawing where the corroded areas are identified at reference numeral 14 in the sensitized portion of the specimen. These corroded areas will normally be of a markedly different color from the metallic luster possessed by the unsensitized area 12 so that an immediate qualitative determination of corrosion can be made by simply inspecting the specimen and comparing the two areas.

For some applications, the extremely rapid rate at which the improved test specimen provides an indication of corrosion may actually be a disadvantage. For example, in packaging some materials in a moisture proof package, a desiccant material is often included to eliminate as far as possible the last traces of moisture. If one of the improved corrosion test specimens were to be introduced into the package at the same time as the desiccant, it might corrode very rapidly during the interval required by the desiccant to achieve equilibrium conditions within the sealed package. For this specific type of application, the corrosion susceptibility of the specimen can be altered by delaying the reaction of the sensitized metallic film to the corrosive atmosphere. The most convenient means for accomplishing this delayed action is to include a suitable corrosion inhibitor directly in the sensitizing composition. For example, sodium chromate can be added to the salt at the time of its application to the metallic film in amounts of from one to ten parts by weight per part of the sensitizing salt. A ratio of two to four parts is particularly preferred. The addition of the corrosion inhibitor thereby delays the activity of the sensitized metal film for a day or more, and this period is long enough to permit the desiccant to reach equilibrium under the conditions of the sealed package. After the delay period, the sensitized metal film becomes an effective corrosion detector and will give reliable results.

In addition to sodium chromate or dichromate, other corrosion inhibitors such as borates, tetraborates, phosphates, polyphosphates, or silicates may also be employed, particularly in combination with the chromates.

The test specimens of the present invention are also adapted for use in systems designed to measure corrosion on a continuing basis. One such system has been schematically illustrated in FIGURE 3 of the drawings. This system makes use of a temperature compensating feature by providing two test elements in the corrosive atmosphere of the same construction, with the exception that one is made subject to the corrosive influences, and the other is protected by means of a suitable coating, such as an epoxy resin, so that it is not affected by the corrosive elements in the environment. The improved test specimens of the present invention lend themselves very well to this type of application. In the circuit diagram of FIGURE 3, reference numeral 20 indicates a test specimen of the type described herein which is subjected to the corrosive environment, and reference numeral 21 is a reference element containing the same type of metal film as the element 20, but provided with a coating which prevents the corrosive attack on the metal film. The elements 20 and 21 are disposed in the corrosive atmosphere, and form two arms of a bridge circuit, of the Wheatstone or Kelvin type which also includes a variable resistor 22 and a fixed resistor 23. A potential is applied, as by means of a battery 24 between opposed legs of the bridge circuit, and a sensing device such as a galvanometer 26 is disposed between the opposite legs of the bridge. Thus, when the corrosion proceeds on the expendable element 20, the increase in electrical resistance caused by the presence of corrosion products and by the reduction in area of the sample itself can be detected continuously by adjusting the variable resistor 22 until there is no current flow in the galvanometer 26. The variable resistor 22 can be calibrated in corrosion units to give a continuous indication of the amount of corrosion which has taken place.

In FIGURES 4 and 5 there is illustrated a form of probe which is particularly adapted for use in the type of circuit shown in FIGURE 3. A backing 31 composed of a material such as polyvinyl chloride has deposited on it an extremely thin film of corrodible metal such as iron. The film is divided into an unprotected, sensitized leg 32, a center tap leg 33, and an unsensitized reference leg 34 having a coating of an impervious material such as an epoxy resin. In particularly corrosive environments, it is not always necessary to sensitize the thin film on the leg 32. Strips of silver paint 36 and 37 are applied across leg 32 and similar strips 38 and 39 are applied on the leg 34. Electrical connections are provided by prongs 41, 42, 43, 44, 45 and 46 which are connected, respectively, to strip 36, strip 37, leg 33, strip 39, strip 38, and leg 34. A positioning prong 47 is also employed to provide for proper attachment to the metering apparatus.

With the assembly of FIGURE 4, the current taps are provided between prongs 41 and 46. For determining the resistance ratio between the corrodible leg 32 and the reference leg 34, prongs 42, 43, and 44 will be in the metering circuit, thereby comprising the resistance of the corrodible element with the reference element. In order to check the integrity of the reference element, a check element is provided by the area of the leg 34 extending between strips 38 and 39. In making the check, prongs 43, 44, and 45 are injected into the metering circuit, and as long as the resistance ratio between these points is constant, there is an assurance that the coating on the reference leg 34 is still protecting that element from corrosive attack.

The following specific examples illustrate the sensitization procedure for various types of corrosion testers.

*Example 1*

A solution is prepared containing 1 gram of ammonium chloride, 3 grams of sodium chromate, and 96 grams of water. One part of this solution is diluted with 9 parts of methanol to provide a sensitizing solution containing 1,000 p.p.m. ammonium chloride and 3,000 p.p.m. sodium chromate. This solution can then be sprayed on the thin metal film.

*Example 2*

For super-sensitized films the spraying solution is prepared by dissolving 1 gram of ammonium chloride in 99 grams of water, and diluting this solution in the ratio of 1 part solution to 9 parts methanol.

*Example 3*

A sensitizing solution with a long delay time is prepared by dissolving 1 gram of ammonium chloride and 4 grams of sodium chromate in 95 grams of water. A sprayable mixture is provided by diluting one part of the solution with 9 parts of methanol.

It will be understood that modifications and variations may be effected without departing from the scope of the novel concepts of the present invention.

I claim as my invention:

1. A corrosion test specimen comprising a thin film of a corrodible ferrous metal bonded to a self-sustaining non-corrodible backing, at least a portion of said film being covered with an inorganic salt which varies the corrosion characteristics of said film, said salt having an anion selected from the group consisting of the acetate, bromate, bromide, chlorate, chloride, fluoride, nitrate, perchlorate, and sulfate, and a cation selected from the group consisting of ammonium, calcium, ferrous, lithium, magnesium, potassium, and sodium.

2. A corrosion test specimen comprising a thin film of a corrodible ferrous metal bonded to a self-sustaining non-corrodible, electrically non-conductive body, at least a portion of said film being covered with an inorganic salt which varies the corrosion characteristics of said film, said salt having an anion selected from the group consisting of the acetate, bromate, bromide, chlorate, chloride, fluoride, nitrate, perchlorate, and sulfate, and a cation selected from the group consisting of ammonium, calcium, ferrous, lithium, magnesium, potassium, and sodium.

3. A corrosion test specimen comprising a thin film of a corrodible ferrous metal bonded to a self-sustaining non-corrodible, electrically non-conductive body, said film having a thickness in the range from 1 to 20 micro-inches, at least a portion of said film being covered with an inorangic salt which varies the corrosion characteristics of said film, said salt having an anion selected from the group consisting of the acetate, bromate, bromide, chlorate, chloride, fluoride, nitrate, perchlorate, and sulfate, and a cation selected from the group consisting of ammonium, calcium, ferrous, lithium, magnesium, potassium, and sodium.

4. A corrosion test specimen comprising a thin film of a corrodible ferrous metal bonded to a synthetic resin backing, at least a portion of said film being covered with an inorganic salt which varies the corrosion characteristics of said film, said salt having an anion selected from the group consisting of the acetate, bromate, bromide, chlorate, chloride, fluoride, nitrate, perchlorate, and sulfate, and a cation selected from the group consisting of ammonium, calcium, ferrous, lithium, magnesium, potassium, and sodium.

5. A corrosion test specimen comprising a thin film of a corrodible ferrous metal bonded to an optically transparent, electrically non-conductive backing, at least a portion of said film being covered with an inorganic salt which varies the corrosion characteristics of said film, said salt having an anion selected from the group consisting of the acetate, bromate, bromide, chlorate, chloride, fluoride, nitrate, perchlorate, and sulfate, and a cation selected from the group consisting of ammonium, calcium, ferrous, lithium, magnesium, potassium and sodium.

6. A corrosion test specimen comprising a thin film of a corrodible ferrous metal bonded to a self-sustaining non-corrodible backing, a portion of said film being covered with an inorganic salt which varies the corrosion characteristics of said film, said salt having an anion selected from the group consisting of the acetate, bromate, bromide, chlorate, chloride, fluoride, nitrate, perchlorate, and sulfate, and a cation selected from the group consisting of ammonium, calcium, ferrous, lithium, magnesium, potassium, and sodium, and an adjoining portion of said film being bare, thereby providing visibly contrasting areas when said specimen is exposed to corrosive conditions.

7. A corrosion test specimen comprising a thin corrodible ferrous metal film bonded to a self-sustaining non-corrodible backing, at least a portion of said film having a sensitizing coating thereon of ammonium chloride to render said film more susceptible to corrosion.

8. A corrosion test specimen comprising a corrodible ferrous metal film of a thickness in the range from about 1 to 20 micro-inches bonded to a self-sustaining non-corrodible backing, at least a portion of said film having a senistizing coating thereon of ammonium chloride to render said metal film more sensitive to corrosion.

9. A corrosion test specimen comprising a corrodible thin ferrous metal film bonded to a self-sustaining non-corrodible backing, at least a portion of said film having a sensitizing coating thereon of ammonium chloride to render said film more susceptible to corrosion, and an inorganic chromate corrosion inhibitor.

10. In a corrosion test assembly employing a corrodible test specimen, a non-corrodible reference specimen exposed to the same temperature conditions as said test specimen, an electrical bridge circuit including said specimens, and means for detecting an unbalance in said bridge circuit, the improvement which comprises a test specimen consisting of a corrodible, thin ferrous metal film bonded to a self-sustaining, non-corrodible backing, at least a portion of said film having a sensitizing coating thereon including an inorganic salt having an anion selected from the group consisting of the acetate, bromate, bromide, chlorate, chloride, fluoride, nitrate, perchlorate, and sulfate, and a cation selected from the group consisting of ammonium, calcium, ferrous, lithium, magnesium, potassium, and sodium.

References Cited in the file of this patent

UNITED STATES PATENTS

| | | |
|---|---|---|
| 2,551,344 | Scholl | May 1, 1951 |
| 2,776,357 | Porath | Jan. 1, 1957 |
| 2,869,003 | Marsh et al. | Jan. 13, 1959 |
| 2,937,524 | Gregor | May 24, 1960 |
| 2,940,018 | Lee | June 7, 1960 |

OTHER REFERENCES

Kure: "Where the Ocean Serves as a Test Tube," Industrial Laboratories, August 1957, pages 58–60.